United States Patent [19]

Merritt

[11] Patent Number: 4,759,319
[45] Date of Patent: Jul. 26, 1988

[54] INTERNAL COMBUSTION ENGINE

[75] Inventor: Dan Merritt, Coventry, England

[73] Assignee: Coventry City Council, Coventry, England

[21] Appl. No.: 24,453

[22] Filed: Mar. 11, 1987

Related U.S. Application Data

[63] Continuation of Ser. No. 710,661, Mar. 12, 1985, abandoned.

[30] Foreign Application Priority Data

Mar. 10, 1984 [GB] United Kingdom ............... 8406337
Mar. 11, 1985 [GB] United Kingdom ............... 8506263

[51] Int. Cl.$^4$ ............................................. F02B 75/12
[52] U.S. Cl. ................................. 123/51 AA; 123/272
[58] Field of Search ................. 123/1 R, 51 R, 51 BD, 123/51 A, 51 B, 51 AA, 51 BA, 53 R, 53 A, 53 AA, 53 B, 53 BA, 272

[56] References Cited

U.S. PATENT DOCUMENTS

| | | | |
|---|---|---|---|
| 642,176 | 1/1900 | Thomson | 123/53 A |
| 2,153,899 | 4/1939 | Shover | 123/51 AA |
| 2,768,616 | 10/1956 | Venediger | 123/51 BD |
| 2,937,630 | 5/1960 | Norton | 123/51 AA |
| 3,481,317 | 12/1969 | Hughes et al. | 123/272 |
| 3,777,718 | 12/1973 | Pattas | 123/51 AA |
| 4,011,839 | 3/1977 | Pfefferle | 123/1 R |
| 4,104,995 | 8/1978 | Steinbock | 123/51 AA |
| 4,393,830 | 7/1983 | Bodine | 123/272 |

Primary Examiner—Craig R. Feinberg
Assistant Examiner—David A. Okonsky
Attorney, Agent, or Firm—Charles E. Brown; Charles A. Brown

[57] ABSTRACT

An internal combustion engine has two cylinders (12, 14) interconnected at their head ends by a combustion chamber (20) which contains a catalyst (22). The cylinders have respective pistons (16, 18) reciprocable towards and way from the combustion chamber (20) and arranged to perform together the induction, compression, expansion and exhaust strokes. Air only or the like is freely inducted into one cylinder (12) while fuel or a fuel/air mixture is metered and inducted into the other cylinder (14) during the induction stroke. The catalyst is of a type which effects a chemical reaction to initiate combustion at a relatively low temperature so that when the fuel/air mix contacts the catalyst at the required temperature ignition takes place. The crank shaft angular phase difference between the pistons (16, 18) is controlled during operation so that the air in the first cylinder (12) is at a higher pressure than the fuel or fuel/air mixture in the other cylinder (14) during compression strokes and is forced through the catalyst, preventing contact of the fuel or fuel/air mixture in the second cylinder (14) with the catalyst until ignition is required when the first piston is in the vicinity of its top dead center. Since it is the movement of the pistons themselves which control the ignition timing the latter is not dependent on the timed induction of the fuel and an external ignition circuit is also not required.

11 Claims, 2 Drawing Sheets

INTERNAL COMBUSTION ENGINE

This is a continuation of application Ser. No. 710,661 filed Mar. 12, 1985, now abandoned.

The present invention relates to internal combustion engines.

The present invention seeks to provide an improved form of internal combustion engine.

Accordingly the present invention provides an internal combustion engine characterised by at least one pair of first and second cylinders interconnected at their head ends by a combustion chamber; ignition means in said combustion chamber; respective first and second pistons reciprocable in said cylinders towards and away from said combustion chamber; first and second means for supplying respectively air or the like without any fuel into said first cylinder and fuel or a fuel/air mixture into said second cylinder during an induction stroke; and control means for controlling movement of said fuel or fuel/air mixture to inhibit ingress of said fuel or fuel/air mixture into said combustion chamber for ignition by said ignition means until said first piston is in the vicinity of its top dead center position.

The term "air or the like" used herein includes any suitable mixture of oxygen with other usually inert gases as well as substantially pure oxygen for combustion with a gaseous or liquid (i.e. vaporised liquid) fuel.

The term "freely inducted" used herein refers to the induction into a cylinder of air or the like without variable throttling which would normally be effected in an internal combustion engine by means of a butterfly valve in a carburetor.

The present invention is further described hereinafter, by way of example, with reference to the accompanying drawings, in which like parts have the same reference numbers and in which.

Figure 1:
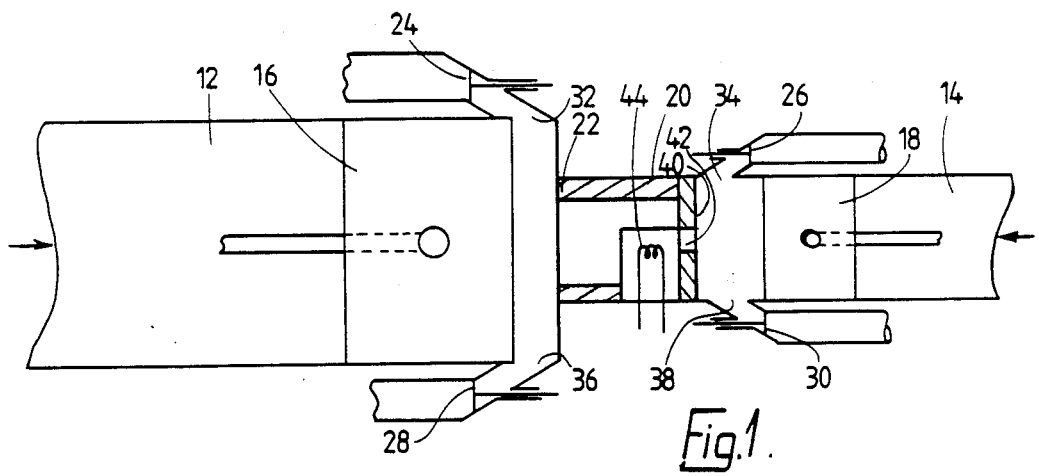
FIG. 1 shows diagrammatically one embodiment of an internal combustion engine according to the present invention.
Figure 2:
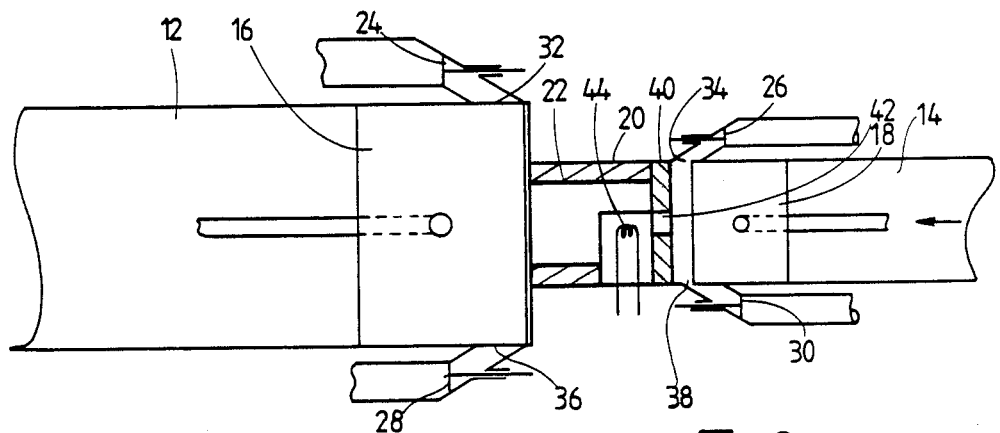
FIG. 2 shows the engine of FIG. 1 with one piston at top dead center.

Referring now to FIGS. 1 and 2 the engine 10 illustrated has one or more pairs of co-operating cylinders 12, 14 containing respective pistons 16, 18 the cylinders 12, 14 being arranged in a head to head manner so that the pistons 16, 18 are opposed. The head ends of the cylinders 12, 14 are in continuous communication via a combustion chamber 20. The cylinders 12, 14 are preferably axially aligned as shown (but may be offset) and for reasons described below one cylinder 12 is of larger swept volume than the other cylinder 14 and has a larger compression ratio.

For the purpose of defining the compression ratios of the cylinders 12, 14 their respective clearance volumes can be regarded as the common volume contained between the heads of the pistons 16, 18 when this volume reaches a minimum volume during the engine cycle. Thus the compression ratio of cylinder 12 is the ratio of the sum of the maximum volume swept by the piston 16 and the above-mentioned minimum volume, divided by the same minimum volume. Similarly, the compression ratio of cylinder 14 is the sum of the maximum volume swept by piston 18 and the minimum volume, all divided by the minimum volume. It will be appreciated that the minimum clearance volume is the same for each cylinder. It is essential for the operation of the engine that the compression ratio of cylinder 12, (the "air admission cylinder") is higher than the compression ratio of cylinder 14, the "fuel admission cylinder").

Since both cylinders 12, 14 intercommunicate and share a common piston clearance volume i.e. through the combustion chamber 20, the cylinder 12 must have a greater swept volume than the cylinder 14 in order to have a greater compression ratio than the latter based on the said clearance volume. The swept volume of the cylinder 12 determines the mass of air induced into the engine whereas the swept volume of the cylinder 14 determines the mass of gaseous fuel, or fuel mixed with air or the like induced or provided in the engine.

The combustion chamber 20 contains ignition means in the form of a porous or like mass 22 of durable heat resistant material well able to withstand operating conditions. The material may conveniently consist of suitable catalytic material or materials but for practical purposes would usually carry or be coated with the catalytic material to provide an extended surface area of the latter. Thus the porous mass 22 is advantageously of metallic (e.g. an alloy such as "fecralloy" steel) or non-metallic material (e.g. ceramic) coated, such as by washcoating, with catalytic material and may be in the form of a porous or interstitial matrix or infrastructure in or through which gas flow can take place. The mass or matrix 22 may be rigid or semi-rigid, such as a body of mesh material, or of honeycomb or corrugated layer formation and partially or completely fills the combustion chamber 20. The porous matrix largely or completely fills the cross-section of the combustion chamber 20 so that gas displaced by the pistons is obliged to pass through the porous mass 22 and requires a difference of pressure to overcome the resistance to such flow by the porous mass 22.

The catalytic material consists of one or more substances which by their presence effect a chemical reaction to initiate combustion at a temperature lower than otherwise possible but which do not take part in the chemical reaction. Thus, for example, the catalyst may consist of platinum or be platinum based, such as a combination of platinum, palladium and rhodium.

The larger swept volume cylinder 12 has the higher compression ratio and receives freely inducted air through an inlet port 24. The smaller swept volume cylinder 14 having the lower compression ratio receives through its inlet port 26 the fuel or fuel/air mixture.

The fuel is inducted into cylinder 14 in gaseous or vaporised form e.g. as propane or other suitable fuel gas. The fuel can be in the form of a fuel gas mixed through a variable metering jet with air or as liquid fuel (e.g. petrol) vaporised and suspended in air or other gas and supplied from a device which pre-mixes the liquid fuel in finely divided form with the air or other gas. Alternatively, in the case of liquid fuel it may be injected directly into the cylinder 14 at some time during the induction stroke for admixture with air received by the cylinder through the inlet port 26 thereto. It will be understood that the timing of the injected fuel is not critical since ignition does not depend on the timing of fuel injection.

The choice of compression ratios, particularly that of cylinder 12, for a given engine will be dependent on the choice of fuel to be used by the engine, and the temperature at which combustion is initiated and propogated at a sufficiently rapid chemical reaction rate when air and fuel are exposed to the catalyst in the combustion chamber 20.

At lower engine speeds, on a compression stroke the pistons 16, 18 move towards one another so that the piston 16 reaches top dead center (TDC) before or no later than the piston 18. Thus, as indicated in FIG. 2, the piston 18 lags behind the piston 16 in this respect by a predetermined angular amount of crankshaft rotation for optimum operation of the engine at that engine speed.

Figure 4:
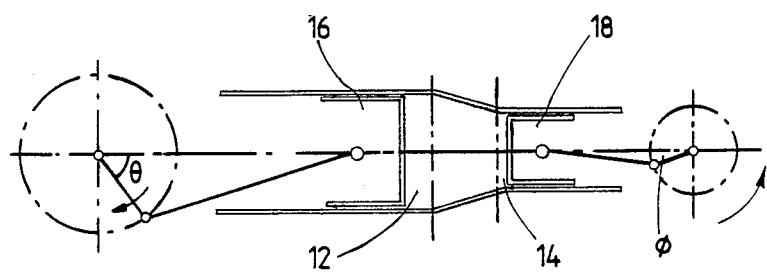
FIG. 4 is a phasing diagram for the engine pistons of FIG. 1.

FIG. 4 shows the phase difference between pistons 16 and 18 with piston 16 just past T.D.C.

At relatively low engine speed operation the amount of angular lag of crankshaft rotation of piston 18 behind piston 16 should be such that when piston 16 reaches its top dead center, at the end of its compression stroke, the volume in cylinder 14 contained between the head of piston 18 and the adjacent boundary of the porous mass 22 in combustion chamber 20 accommodates the whole mass of fuel and air inducted into cylinder 14 and contained within cylinder 14 during the latter part of the compression stroke preceding the instant when piston 16 reaches its top dead center.

For higher engine speeds the lag of piston 18 behind piston 16 may be reduced to smaller amounts of angular crankshaft rotation and may reach a zero value or even negative values in which case piston is may lead piston 16 if the engine requirement for the timing of the initiation of combustion in the combustion chamber 20 so dictates at that speed.

The pistons are interconnected and synchronised for such operation by any suitable form of crank, linkage, gear or other mechanism providing an output shaft such as a crankshaft for motive power output. The connecting mechanism may provide for variation in the amount of crankshaft angular phase difference between the pistons 18 and 16, e.g. to advance or retard ignition and/or to suit different fuels. This variation may be effected while the engine is running using a suitable self-adjusting mechanism. Likewise, valve gear for operation of the inlet valves 24, 26 and exhaust valves 28, 30 of respective ports 32, 34 and 36, 38 may be of any appropriate construction and mode of operation although timing of operation of the inlet valve 26 may be varied as referred to later.

Liquid or air cooling of the cylinders 12, 14 and combustion chamber 20 is provided as appropriate.

During operation of the engine, since combustion occurs when the fuel/air mixture contacts the catalyst in the porous mass 22 in the combustion chamber 20, entry of the fuel/air mixture into the porous mass 22 has to be controlled to obtain combustion at the correct time and rate of flow so as to avoid both delayed and premature combustion, especially the latter. This control is effected by controlling the crankshaft angular phase difference between pistons 16 and 18 to ensure that the fuel/air mixture contacts the catalyst and combustion takes place when piston 16 is in the vicinity of its TDC.

In four stroke operation of the engine the sequence, beginning with an induction stroke, at lower engine speeds is as follows:

During the induction stroke of the pistons 16, 18 i.e. as they move apart from TDC, air only is drawn into cylinder 12 and a controlled amount of gaseous fuel or fuel/air mixture is admitted, or occurs, in cylinder 14.

The pistons 16, 18 then pass through bottom dead center (BDC) and move towards one another for a compression stroke, the inlet and exhaust valves 24, 26, 28, 30 being closed. Piston 18 lags in crank angle rotation behind piston 16 and the air in cylinder 12 i.e. contained in the space between the piston 16 and the adjacent boundary of the porous mass 22, is compressed to a higher pressure for a given crank angle than the gaseous fuel or fuel/air mixture in the similar space in cylinder 14. This forces air from cylinder 12 through the porous mass 22 in the combustion chamber 20 into cylinder 14 and thus initially prevents the gaseous fuel or fuel/air mixture in cylinder 14 entering into the combustion chamber 20 and contacting the catalyst during at least a major part of the compression stroke. However, when piston 16 passes through its TDC and piston 18 in cylinder 14 approaches TDC (FIG. 2) the gaseous fuel or fuel/air mixture in cylinder 14 is then forced into the combustion chamber 20 where its contact with air entrained in the porous mass 22 and the catalyst results in combustion of the mixture taking place to effect a power stroke movement of pistons 16, 18 away from one another. The clearance volume of cylinder 14 not included in the porous mass 22 in the combustion chamber 20 should be kept to a minimum.

A change in the phase lag in the compression movement of the piston 18 in relation to the piston 16 serves to effect a change in the timing of the transfer of the gaseous fuel or fuel/air mixture into the combustion chamber 20, to allow for ignition delay. The ignition delay being a period of time indicated by the speed of initiation of combustion by the catalyst and the speed of propogation of combustion within the porous mass 22.

To enable a satisfactory initiation of combustion in the combustion chamber 20 at higher speeds the lag in crankangle rotation of piston 18 behind piston 16 may be decreased, by a suitable governing mechanism, to a value suited to the given engine speed, the adjustment being carried out whilst the engine is running. As is mentioned above, as pistons 16 and 18 move towards each other from bottom dead center for a compression stroke, air from cylinder 12 is forced through the porous mass 22 in the combustion chamber 20 into cylinder 14 to prevent premature entry of gaseous fuel or fuel/air mixture into the porous mass 22 from cylinder 14. The timing of the entry of fuel or fuel/air mixture from cylinder 14 to the porous mass 22 in the combustion chamber 20 is dictated by the phase difference in crank angle rotation of pistons 16 and 18 and which is chosen to suit the ignition delay period necessary for the fuel and air mixture, of a given mass proportion, at a particular engine speed.

At higher engine speeds, when the lag in phase difference of crank angle rotation is decreased, the transfer of air from cylinder 12 into cylinder 14 through the porous mass 20 during the early stages of the compression stroke of pistons 16 and 18 may be assisted or effected using an engine which has a delayed opening of the inlet valve 26 relative to the inlet valve 24 during the induction strokes of the pistons 16 and 18. This helps to provide a reduced pressure in cylinder 14 relative to cylinder 12 during the induction stroke and into the compression stroke to ensure that the flow of gas is from cylinder 12 to cylinder 14, through the porous mass 20, preventing premature entry of fuel into the porous mass 20. Alternatively or additionally this effect may also be achieved by throttling the fuel or fuel air mixture which is inducted into cylinder 14 through valve 26.

After combustion, the return of the pistons 16, 18 from BDC performs an exhaust stroke to expel the exhaust gases from the cylinders 12, 14 through the exhaust ports 36, 38 and open exhaust valves 28, 30 in readiness for a further induction stroke. Although two such ports are shown, it will be appreciated that only port 36 is sufficient.

The passage of air only during a compression stroke through the porous mass 22 from cylinder 12 both purges the porous mass 22 of any remaining exhaust gas and also delays entry of gaseous fuel or fuel/air mixture into the combustion chamber 20 and into contact with the catalyst until the piston 16 has substantially reached TDC. During the induction stroke if both inlet valves 24, 26 are opened at the same time there may be a tendency for pressure in cylinder 12 to decrease below pressure in cylinder 14 at a given instant. This would tend to induce the fuel/air mixture admitted to or formed in cylinder 14 to flow into the porous mass 22 towards cylinder 12, causing premature combustion. To avoid this, opening of the inlet valve 26 may be delayed a preselected time relative to the inlet valve 11. Alternatively or additionally, this effect may also be achieved by throttling the fuel or fuel/air mixture which is inducted into cylinder 14 through valve 26.

Mixing of the fuel and air mixture from cylinder 14 with air in the porous mass 22 from cylinder 12 may be enhanced by the provision of a partition plate 40 located between cylinder 14 and the porous mass 22 in the combustion chamber 20, the plate 40 having one or more restriction orifices 42. The plate 40 and orifices 42 restrict and determine the location and rate of entry of the gaseous fuel or fuel/air mixture into the combustion chamber 20 and porous mass 22. The latter may be provided with axial passages aligned with the orifices and radial passages extending from the axial passages.

The orifices also assist in preventing diffusion of the fuel or fuel/air mixture into the porous mass 22 until combustion is required, especially at low engine speeds, since during a compression stroke the orifices provide relatively high speed jets of air from cylinder 12 to cylinder 14.

An additional feature of the orifices is that, depending on their size and number, they can be used to prevent relatively fast running of the engine, acting as self governors, by restricting the passage of air, fuel and fuel/air mixture.

Whereas the above refers to four stroke operation of the engine, two stroke operation is also possible with the provision of suitable transfer and exhaust porting.

As is mentioned above, for speed and power output control of the engine the admission of gaseous fuel into the cylinder 14 as fuel or a fuel/air mixture is controlled by either a variable fuel metering jet or jets, or a suitable gas throttle. Alternatively, the rate of injection of pressurised fuel into the cylinder 14 or into an external fuel/air mixing device is metered accordingly. However, admission of air only into the cylinder 12 is not throttled and is controlled only by the inlet valve 24.

For starting purposes a glow plug 44 is shown provided in the combustion chamber 20 to initiate combustion until it is satisfactorily effected by the catalytic material of the porous mass 22.

Alternatively, combustion may be initiated by the initial use of fuel gases which react with air in the presence of a catalyst at relatively low temperatures, one such gas being hydrogen.

It will be appreciated that the effect of the catalyst is to allow initiation of combustion of the resulting fuel/air mixture in the combustion chamber 20 at a lower initiation temperature than spark temperature in the case of a spark ignition engine and at a lower pressure than in the case of compression ignition in a conventional compression ignition (diesel) engine. Furthermore, combustion of a much lower ratio of fuel to air is possible with resulting economy of operation when the engine is running at only part load. Higher thermal efficiency at part load is also possible compared with existing engines.

Combustion takes place in a smooth and even manner without or with minimal explosive action so that quite running with less vibration is obtained, this also being in the interests of reducing stress on and wear of the working parts of the engine. Furthermore, substantially complete combustion of hydrocarbon fuel may be obtained resulting in cleaner exhaust emission well within current regulations in this respect. Peak combustion temperatures can be kept below the temperatures at which nitrogen forms oxides in air resulting in an exhaust emission free or substantially free of pollution from oxides of nitrogen and which again adequately complies with present emission regulations.

The construction and mode of operation of the engine allows air only to pass through the combustion chamber 20 from the cylinder 12 into the cylinder 14 during at least a major part or the whole of the compression stroke thus purging the catalyst of the products of previous combustion. The induction of air into the cylinder 12 is not obstructed by a throttle valve so that as much air as possible is allowed to enter the engine. The effect of a transfer of a fuel/air mixture from the cylinder 14 into the combustion chamber 20 at a suitable crank angle near TDC for the cylinder 14 results in the mixture being added to the air already in the chamber 20. This is then followed by combustion initiated by the action of the catalyst 22 at a time which takes account of the rapidity of the initiation and propagation of the combustion process within the porous mass 22, this time being determined not by the timing of the fuel or fuel/air induction or by a spark but by the phase difference in crank angle rotation of the pistons 16, 18. It is believed that the catalytic porous mass 22 should have a reasonable serviceable life and the construction of the engine may be such that the mass 22 can be readily changed i.e. as a cartridge which can be inserted into and withdrawn from the combustion chamber 3 through a closable opening in the latter preferably without dismantling the engine.

Figure 3:
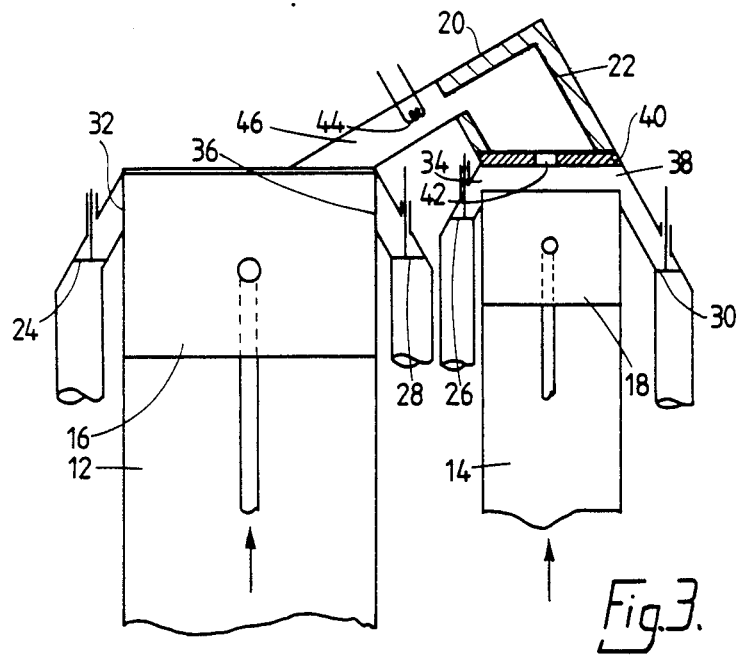
FIG. 3 shows a modified form of the engine of FIG. 1.

In an alternative arrangement of the engine whether for four stroke or two stroke operation the cylinders 12, 14 may be otherwise arranged e.g. side by side (FIG. 3) with their head ends continuously communicated by a combustion chamber 20 containing a porous catalytic mass 22. In the arrangement shown in FIG. 3 the combustion chamber 20 is arranged in direct communication with the cylinder 14, a communicating duct 46 being provided from and to the cylinder 12. The mode of operation and advantages of this compact arrangement are substantially the same as those already described above.

The pistons 16, 18 of such a side by side arrangement can be connected to operate a common crankshaft whilst any suitable number of pairs of cylinders 12, 14 with respective combustion chambers 20 may be employed.

The absence of spark ignition apparatus simplifies and reduces the cost of manufacture of the engine and also the cost of maintenance. Absence of possible spark ignition failure also ensures greater reliability.

The absence of a high pressure fuel injection pump external to the engine also simplifies and reduces both manufacturing and maintenance costs of the engine.

Although the use of a porous mass covered by catalytic material as the ignition means provides a number of practical advantages as referred to above and should be effective in practice, if desired it may be substituted by other suitable continuously present ignition means such as a continuously operating glow plug 44 in the combustion chamber 20 or duct 46 or catalytic material which only partially fills the combustion chamber cross section, although in such a case a restriction such as the partition plate 40 with one or more orifices 42 would be necessary. This would not be so advantageous as regards low temperature combustion of a weak mixture and a pollution free exhaust emission but would only entail simple electric current supply to the or each glow plug as compared with the high tension and distribution circuitry of a conventional spark ignition engine.

The pressure of air and fuel or fuel/air mixture may be boosted to assist induction of air into cylinder 12 and fuel or fuel/air mixture into cylinder 14.

I claim:

1. An internal combustion engine comprising: at least one pair of first and second cylinders, said cylinders having head ends, said first cylinder having a larger swept volume than said second cylinder; a combustion chamber interconnecting said cylinders at their head ends; respective first and second pistons movable in said first and second cylinders towards and away from said combustion chamber; first means for supplying a charge of substantially air only into said first cylinder during an induction stroke of said first piston; second means for supplying a charge of fuel only in said second cylinder to form a rich fuel/air mixture therein during an induction stroke of said second piston; restricting means only between said second cylinder and said combustion chamber for restricting dispensing of fuel/air mixture from said second cylinder into said combustion chamber until combustion is required and for assisting in mixing of said fuel/air mixture with air in said combustion chamber; ignition means in said combustion chamber, said ignition means comprising catalytic material only partially filling said combustion chamber cross-section to allow the free flow of gases through said combustion chamber between said first cylinder head end and said restricting means and wherein exhaust gases are exhausted from said second chamber through said combustion chamber and through an exhaust port means in said first cylinder.

2. An internal combustion engine comprising: at least one pair of first and second cylinders, said cylinders having head ends, said first cylinder having a larger swept volume than said second cylinder; a combustion chamber interconnecting said cylinders at said head ends; respective first and second pistons movable in said cylinders towards and away from said combustion chamber; first means for supplying a charge of substantially air only into said first cylinder during an induction stroke of said first piston; second means for supplying fuel into said second cylinder to form a rich fuel/air mixture in said second cylinder during an induction stroke of said second piston; restricting means only between said second cylinder and said combustion chamber for restricting dispensing of fuel/air from said second cylinder into said combustion chamber until combustion is required and for assisting in mixing of said fuel/air mixture with air in said combustion chamber; and ignition means in said combustion chamber, said ignition means comprising catalytic material only partially filling said combustion chamber cross-section to allow free flow of gases through said combustion chamber between said first cylinder head end and said restricting means.

3. An engine as claimed in claim 2 wherein said second means is operable to supply a charge of fuel only directly into said second cylinder.

4. An engine as claimed in claim 2 wherein said second cylinder is free of an exhaust port means opening directly into said cylinder, exhaust gases in said first and second cylinders being exhausted through common exhaust port means in said first cylinder.

5. An engine as claimed in claim 2 wherein said second means is operable to supply fuel into said second cylinder at a preselected time after said first means commences the supply of air into said second cylinder.

6. An engine as claimed in claim 2 wherein said engine is a compression ignition engine.

7. An engine as claimed in claim 2 wherein said restricting means between said second cylinder and said combustion chamber comprises a partition means having at least one orifice therethrough.

8. An engine as claimed in claim 2 wherein at least at low engine speeds said second piston lags said first piston.

9. An engine as claimed in claim 2 further comprising means for controlling relative movement of said pistons by controlling the crankshaft angular phase difference between the pistons.

10. An engine as claimed in claim 9 wherein said controlling means is operable to adjust said phase difference in dependence on the speed of said engine.

11. An engine as claimed claim 10 wherein said phase difference is continuously adjustable.

* * * * *